United States Patent
Pruitt et al.

(10) Patent No.: US 6,851,381 B1
(45) Date of Patent: Feb. 8, 2005

(54) AIRBORNE MINE NEUTRALIZATION SYSTEM, NEUTRALIZER PRESSURE RELIEF VALVE

(75) Inventors: Thomas Pruitt, Panama City, FL (US); Daniel Georgiadis, Panama City, FL (US); Joseph Papciak, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/402,903

(22) Filed: Mar. 25, 2003

(51) Int. Cl.$^7$ ................................................ B63G 8/14
(52) U.S. Cl. ................................................ 114/331
(58) Field of Search .............................. 114/312, 313, 114/330, 331, 333

(56) References Cited

U.S. PATENT DOCUMENTS 5,623,958 A * 4/1997 Bumpers .................... 137/269
5,876,872 A * 3/1999 Feezor ......................... 429/118
2003/0154900 A1 * 8/2003 Freund et al. .............. 114/330

* cited by examiner

Primary Examiner—Stephen Avila
(74) Attorney, Agent, or Firm—Donald G. Peck; Harvey A. Gilbert

(57) ABSTRACT

A combination pressure relief valve system and undersea vehicle vents pressurized gas from lithium batteries to ambient. An undersea vehicle having an interior has a pair of hollow pylons each having a passageway fluidly communicating with the interior. A pressure relief valve is mounted on each pylon, and each pressure relief valve has a body portion having an inner bore fluidly communicating with a passageway. An elongate valve plug in the body portion is interposed between each passageway and ambient and the valve plug has a lateral bore and a circumferentially disposed O-ring. A nose portion is secured to the body portion, and the nose portion has a pair of laterally aligned bores aligned with the lateral bore of the elongate valve plug. A wire extends through the laterally aligned bores and lateral bore. The O-ring and wire retain the valve plug interposed between a passageway and ambient.

18 Claims, 4 Drawing Sheets

AIRBORNE MINE NEUTRALIZATION SYSTEM, NEUTRALIZER PRESSURE RELIEF VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a safety device for an undersea vehicle using lithium batteries. More particularly, this invention is to a pressure relief valve system for venting Li/SO2 vapors created by lithium batteries to prevent damage to an undersea vehicle.

The long shelf-life and higher watt-hours per unit volume of lithium batteries as compared to other contemporary batteries is well known. Marine designers have included lithium batteries in unmanned submersibles where a compact high-power electrical source is needed to produce sufficient power for prolonged operations at considerable depth.

One of the major consequences of using high power density lithium batteries, however, is that they can produce considerable amounts of pungent and toxic $Li/SO_2$ vapors at temperatures above their venting point of about 200° F. Such temperatures could be created in the event of a shipboard fire in either the magazine where the submersibles are stored or in an adjacent compartment. One instance where ambient temperatures increased from 200° F. to about 251° F. caused one lithium-battery equipped undersea vehicle to have its nosepiece portion separate from its body portion. When $Li/SO_2$ vapors reached oven temperatures of about 251° F., internal pressures in the range between 100 psi and 200 psi were created by the $Li/SO_2$ vapors in the interior of the vehicle and the nose portion separated. Irrespective of the advantages of having a lithium battery power source aboard, the undersea vehicle could not be used until this damage was repaired.

Thus, in accordance with this inventive concept, a need has been recognized in the state of the art for a reliable internal pressure relief valve system for an undersea vehicle containing lithium batteries in an undersea vehicle capable of diving to considerable depths.

OBJECTS AND SUMMARY OF THE INVENTION

An object of the invention is to provide a pressure relief valve system for an undersea vehicle.

Another object of the invention is to provide a pressure relief valve system for an undersea vehicle containing lithium batteries.

Another object of the invention is to provide a reliable pressure relief valve system having two pressure relief valves fluidly communicating with an interior containing lithium batteries.

Another object of the invention is to provide a pressure relief valve system for an undersea vehicle containing lithium batteries and being capable of diving to considerable depths.

These and other objects of the invention will become more readily apparent from the ensuing specification when taken in conjunction with the appended claims.

Accordingly, the present invention is to a combination pressure relief valve system and undersea vehicle that vents pressurized gas from lithium batteries to ambient. An undersea vehicle has a pair of hollow pylons each having a passageway fluidly communicating with an interior of the undersea vehicle. A pressure relief valve is mounted on each pylon, and each pressure relief valve has a body portion having an inner bore fluidly communicating with a passageway. An elongate valve plug is interposed between each passageway and ambient, and the valve plug has a lateral bore and a circumferentially disposed O-ring. A nose portion is secured to the body portion, and the nose portion has a pair of laterally aligned bores aligned with the lateral bore of the elongate valve plug. A wire extends through the laterally aligned bores and lateral bore. The O-ring and wire retain the valve plug interposed between the passageway and ambient. When the pressurized gas exceeds a predetermined threshold in a passageway, the frictional force of the O-ring is overcome and the wire is sheared to displace a valve plug and vent the pressurized gas to the ambient. A stem portion of the valve plug extends through the nose portion to visually indicate that the pressurized gas has exceeded the predetermined threshold to permit appropriate action.

DESCRIPTION OF THE PREFERRED EMBODIMENTS

Figure 1:
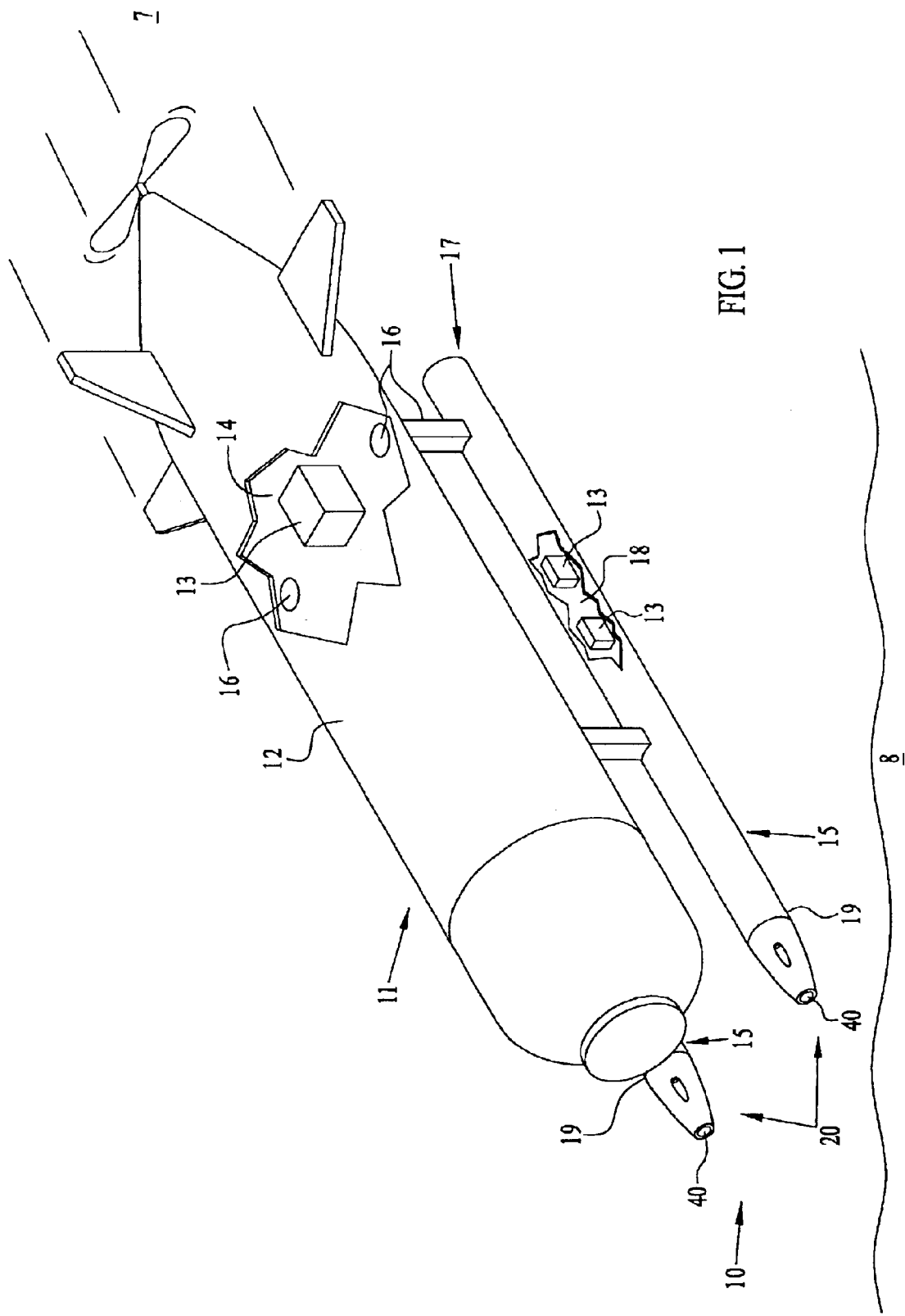
FIG. 1 is a schematic, partially cross-sectional isometric view of an unmanned undersea vehicle including the pressure relief valve system of the invention being capable of diving to considerable depths.

Referring to FIG. 1, pressure relief valve system 10 of the invention vents gases from an unmanned undersea vehicle 11 that could otherwise build in pressure and possibly compromise the integrity of a pressure hull 12. Undersea vehicle 11 can rapidly transit underwater and can be dropped through air 7 from an aircraft (not shown). Vehicle 11 is capable of diving to considerable depths in water 8, in excess of five hundred feet. Undersea vehicle 11 has lithium batteries 13 in an interior 14 in hull 12 and/or in a pair of hollow pylons 15 located outside of and below hull 12.

An open duct 16 extends from the aft part 17 of each hollow pylon 15 to fluidly communicate with interior 14. Ducts 16 could couple harmful levels of pressurized vapors, or gas either to or from interior 14. This pressurized gas can include $Li/SO_2$ vapors as well as other vapors from other types of lithium batteries having other lithium chemistries. If batteries 13 are not contained in pylons 15 but are only in interior 14, then ballast (not shown) can be included in pylons 15 to help keep undersea vehicle 11 properly oriented. Irrespective if whether batteries 13 or ballast is contained in each pylon 15, a fluidly communicating passageway 18 extends between ducts 16 and a forward open end part 19 of each pylon 15 for venting pressurized gases as explained below. Ducts 16 may also contain electrical leads (not shown) that reach from batteries 13 in pylons 15, into interior 14, and to control/sensor/propulsion modules (not shown) for operating vehicle 11 during its successful completion of a mission.

Figure 2:
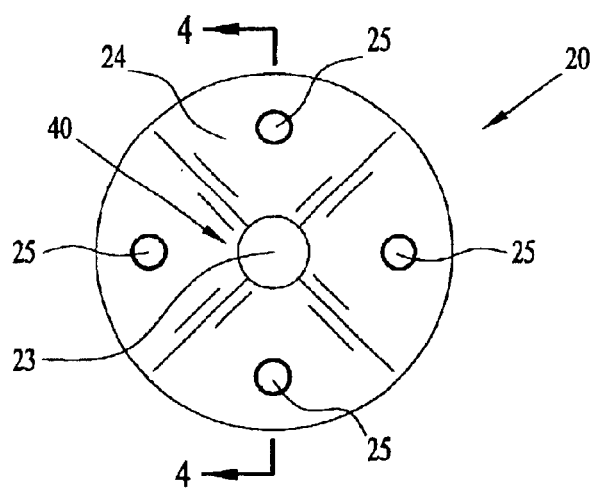
FIG. 2 is front view of a pressure relief valve.
Figure 3:
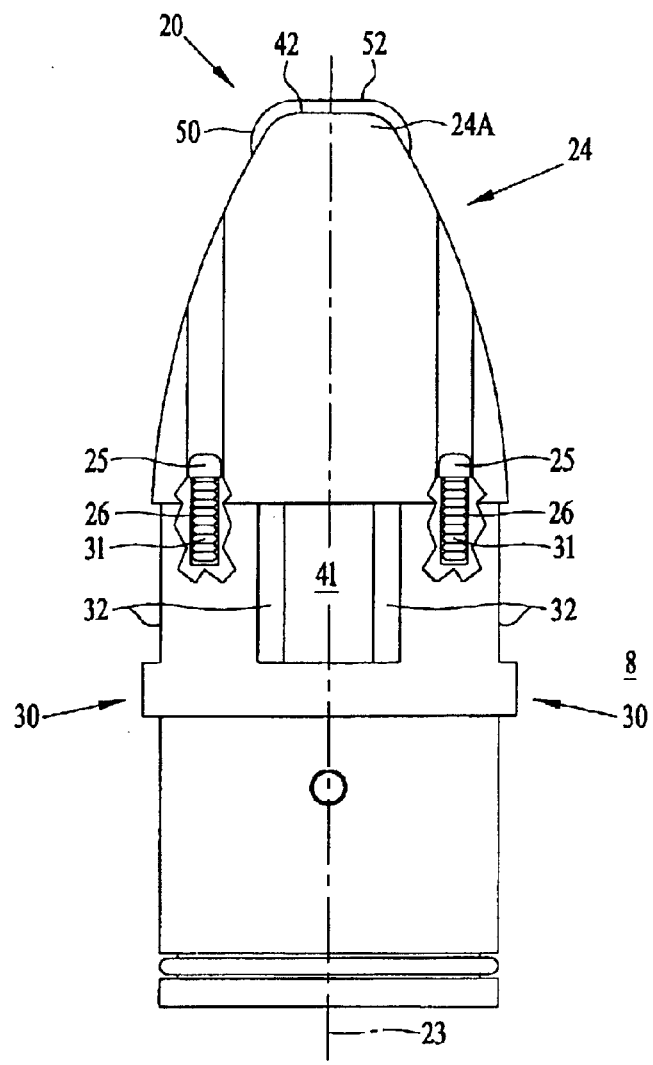
FIG. 3 is a side view partially in cross section of the pressure relief valve of FIG. 2.
Figure 4:
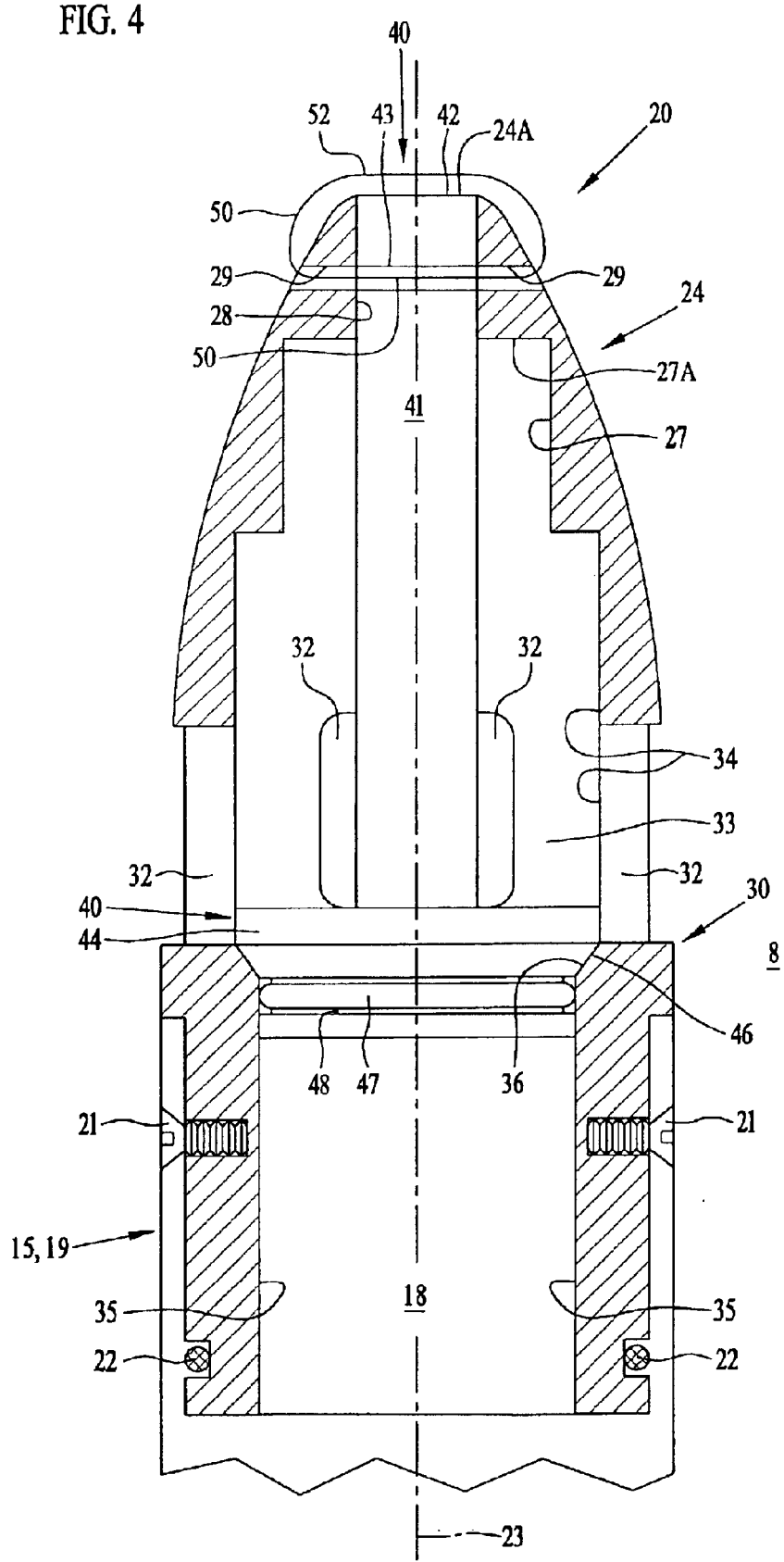
FIG. 4 is a cross-sectional schematic side view of the pressure relief valve taken generally along line 4—4 in FIG. 2 showing the pressure relief valve in the closed position.

Referring also to FIGS. 2, 3, and 4, a pressure relief valve 20 of pressure relief valve system 10 is fitted into and secured in forward open end part 19 of each pylon 15 by bolts 21. An O-ring 22 on valve 20 prevents ambient air 7 or water 8 from leaking into passageway 18 in hollow pylon 15 and/or pressurized gases from leaking from passageway 18 into the ambient.

Each pressure relief valve 20 is centered on a longitudinal axis 23 that extends through each hollow pylon 15. Each pressure relief valve 20 has a rounded cone-shaped nose portion 24 connected to an essentially cylindrically-shaped body portion 30 by four threaded bolts 25. Threaded bolts 25 each extend through a separate bore 26 in nose portion 24 to engage mating threads in a separate threaded bore 31 of body portion 30. After being tightened, bolts 25 securely hold nose portion 24 and body portion 30 together.

Each body portion 30 is machined to have four orthogonally disposed rectangular-shaped slots 32 communicating with an interior 33 within in an outer bore 34 coaxially extending in nose portion 24 and body portion 30. Body portion 30 has an inner bore 35 inwardly coaxially disposed with respect to outer bore 34. Inner bore 35 fluidly communicates with passageway 18 in pylon 17, and an angled annular shoulder 36 is machined in body portion 30 to span the transition between outer bore 34 and inner bore 35.

Each nose portion 24 has an intermediate bore 27 and central bore 28 both coaxially disposed with respect to outer bore 34. Bores 34, 27 and 28 fluidly communicate with interior 33 and slots 32.

An elongate valve plug 40 has a round stem portion 41 sized to permit axial sliding displacement along longitudinal axis 23 in central bore 28 of nose portion 24, and a round valve head 44 sized to permit axial sliding displacement along longitudinal axis 23 in outer bore 34. Valve head 44 has an angled annular shoulder 46 oriented for substantially contiguously abutting angled annular shoulder 36 on body portion 30 when outer end 42 of stein portion 41 is at the outer forward surface 24A of nose portion 24, see FIG. 4. The contiguous abutment of shoulders 46, 36 protects pressure relief valves 20 from damage when vehicle 11 is making a high-speed transit in water 8, and more particularly, when vehicle 11 is drop-launched a distance of up to forty feet in air 7 from an aircraft and impacts water 8.

When angled annular shoulder 46 contiguously abuts angled annular shoulder 36, valve head 44 partially extends into inner bore 35 and an O-ring 47 in a circumferential groove 48 around valve head 44 is held compressed between inner bore 35 and valve head 44 to seal passageway 18 from interior 33. The compression of O-ring 47 creates a frictional force that is exerted by O-ring 47 to hold, or retain valve head 44 inside of inner bore 35. This frictional retaining by O-ring 47 maintains the seal between passageway 18 and interior 33.

Retention of valve head 44 in inner bore 35 is further assured by a thin safety wire 50 threaded through aligned small lateral bores 29 in nose portion 24 that are aligned with a small lateral bore 43 in stem portion 41. Thin safety wire 50 extends through the aligned lateral bores 29, 43 and is tied or otherwise joined at opposite ends to a heavier wire or looped and secured onto itself along loop section 52 that reaches across the front of forward surface 24A of nose portion 24. A 15 thousandths of an inch outer diameter copper wire was used as safety wire 50 and together with the frictional retaining force created between O-ring 47 and inner bore 35, gas pressures in the range of 13 to 30 psi could be retained in passageway 18 before O-ring 47 would be displaced in inner bore 35 and safety wire 50 would be sheared by the ends of lateral bore 43 in axially displaced stem portion 41 of valve plug 40, see FIG. 5. The threshold pressure range could be other than 13 to 30 psi, however this threshold range was found to be below the range of internal gas pressures that might disable or damage vehicle 11.

Pressure relief valve system 10 of the invention has two pressure relief valves 20 each mounted on a separate hollow pylon 15 that each fluidly communicates through an internal passageway 18 and through duct 16 to interior 14 of pressure hull 12. Excessive gas pressures created by lithium batteries 13 in any of interior 14 or passageway 18 in either hollow pylon 15 will be fluidly communicated to pressure relief valves 20 in both pylons 15. The excessive gas pressures can act on each elongate gas plug 40 in each pressure relief valve 20 until the threshold pressure range is exceeded. Then, the frictional retaining force between each O-ring 47 and inner bore 35 is overcome, and safety wire 50 is sheared in aligned lateral bores 29, 43 in one or the other of pressure relief valves 20. Either elongate gas plug 40 is axially displaced along its longitudinal axis 23 during the overcoming of frictional retaining force of O-rings 47 and shearing of safety wire 50. The axial displacement also moves valve head 44 in inner bore 35. Displacement of valve head 44 separates abutting annular surfaces 36, 46 and O-ring 47 is pulled from inner bore 35 and into interior 33. Pressurized gas (shown by arrows 70) is vented from passageway 18 through slots 32 and into the ambient air or water 7, 8 to alleviate an otherwise debilitating, hazardous condition.

Figure 5:
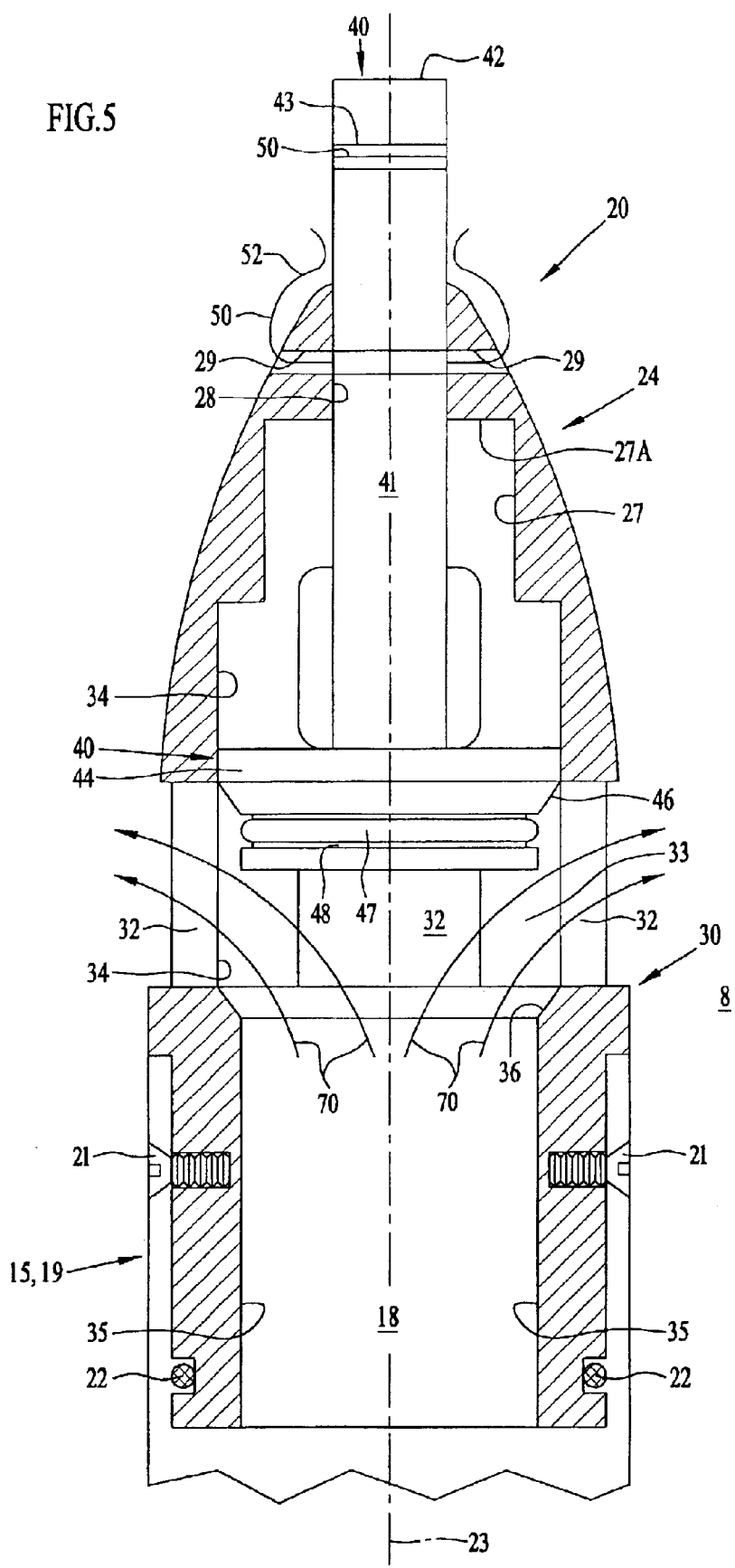
FIG. 5 is a cross-sectional schematic side view of the pressure relief valve taken generally along line 4—4 in FIG. 2 showing the pressure relief valve in the open or venting position.

When excessive pressurized gas 70 has been vented through slots 32, the axially displaced valve plug 40 has its stem portion 41 extended, or reaching from nose portion 24 as shown in FIG. 5. This extended condition of stem portion 41 can be observed and, when observed, undersea vehicle 11 can be inspected and repaired, if needed, to make sure that vehicle 11 is in a state of operational readiness. Usually after stem portion 41 has been extended, O-ring 47 is replaced on valve head 44, since it may have been damaged by vented gases 70 or displacement of valve head 44. Valve plug 40 then is reassembled with a new O-ring 47 and wire 50, 52 in pressure relief valve 20 to again be as shown in FIG. 4.

Pressure relief valve system 10 is a sound marine engineering design having redundancy of mutually communicating pressure relief valves 20 and pylons 15 with interior 14 of undersea vehicle 11. This redundancy assures safe venting of excessive pressures by one of pressure relief valves 20 even if the other valve 20 is damaged or otherwise disabled.

Optionally, where higher pressures inside of passageway 18 (and interior 14) can be tolerated, a coiled biasing spring (not shown) can helically extend around stem portion 42 and be held in compression between valve head 44 and end wall 27A of intermediate bore 27. The biasing spring could push against valve head 44 to force its angled annular shoulder 46 to contiguously abut angled annular shoulder 36 on body portion 30 more forcefully to allow O-ring 47 to withstand greater internal pressures in passageway 18.

The biasing force exerted by the coiled spring could be predetermined to hold abutting shoulders 46, 36 together and O-ring 47 in its sealing relationship in inner bore 35 when the pressure created by gases in passageway 18 is below a certain threshold level range. A typical gas-pressure threshold can be in excess of the 15–30 psi range. Having the teachings of this invention in mind, modifications and alternate embodiments of pressure relief valve system 10 may be adapted without departing from the scope of the invention. Its uncomplicated, compact design incorporates structures and technologies long proven to operate successfully in hostile land and marine environments associated with a host of undersea activities. Pressure relief valve system 10 of the invention can be made larger or smaller in different shapes and fabricated from a wide variety of materials to assure resistance to corrosion and sufficient strength for long-term reliable operation under a multitude of different operational requirements.

The disclosed components and their arrangements as disclosed herein, all contribute to the novel features of this invention. Therefore, pressure relief valve system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A combination pressure relief valve system and undersea vehicle for venting pressurized gas to ambient comprising:
    an undersea vehicle having an interior;
    a pair of hollow pylons on said undersea vehicle each having a passageway fluidly communicating with said interior; and
    a pressure relief valve on each pylon, each pressure relief valve having,
        a body portion having an inner bore fluidly communicating with a passageway,
        an elongate valve plug in said body portion being interposed between a passageway and ambient, said valve plug having a lateral bore and a circumferentially disposed O-ring,
        a nose portion secured to said body portion, said nose portion having a pair of laterally aligned bores aligned with said lateral bore of said elongate valve plug, and
        a wire extending through said laterally aligned bores and said lateral bore.

2. The system of claim 1 wherein said O-ring and said wire retain said elongate valve plug interposed between a passageway and ambient.

3. The system of claim 2 further comprising:
    an angled annular shoulder machined in said body portion; and
    an angled annular shoulder on said valve plug, said angled annular shoulders substantially contiguously abutting each other.

4. The system of claim 3 wherein said O-ring exerts a frictional force against said inner bore of said body portion and said wire retains said elongate valve plug interposed between a passageway and ambient.

5. The system of claim 4 further comprising:
    a source of pressurized gas fluidly communicating with said interior and each passageway, said source of pressurized gas being lithium batteries.

6. The system of claim 5 wherein said pressurized gas exceeds a predetermined threshold in a passageway to overcome said frictional force of said O-ring and shear said wire to displace said valve plug and vent said pressurized gas to ambient.

7. The system of claim 6 wherein said nose portion has an axially extending bore, and said valve plug has a stem portion sized to slide through said axially extending bore to reach outside said nose portion when said pressurized gas exceeds said predetermined threshold.

8. The system of claim 7 wherein said stem portion reaching through said nose portion visually indicates said pressurized gas has exceeded said predetermined threshold.

9. The system of claim 8 wherein said wire is a fifteen thousandths of an inch outer diameter copper wire.

10. A pressure relief valve system for venting pressurized gas to ambient comprising:
    a pair of hollow pylons for an undersea vehicle each having a passageway fluidly communicating with each other; and
    a pressure relief valve mounted on each pylon, each pressure relief valve having a body portion having an inner bore fluidly communicating with a passageway, an elongate valve plug in said body portion being interposed between a passageway and ambient, said valve plug having a lateral bore and a circumferentially disposed O-ring, a nose portion secured to said body portion, said nose portion having a pair of laterally aligned bores aligned with said lateral bore of said elongate valve plug, and a wire extending through said laterally aligned bores and said lateral bore.

11. The system of claim 10 wherein said O-ring and said wire retain said elongate valve plug interposed between a passageway and ambient.

12. The system of claim 11 further comprising:
    an angled annular shoulder machined in said body portion; and
    an angled annular shoulder on said valve plug, said angled annular shoulders substantially contiguously abutting each other.

13. The system of claim 12 wherein said O-ring exerts a frictional force against said inner bore of said body portion and said wire retains said elongate valve plug interposed between a passageway and ambient.

14. The system of claim 13 further comprising:
    a source of pressurized gas fluidly communicating with each passageway, said source of pressurized gas being lithium batteries.

15. The system of claim 14 wherein said pressurized gas can exceed a predetermined threshold in a passageway to overcome said frictional force of said O-ring and shear said wire to displace said valve plug and vent said pressurized gas to ambient.

16. The system of claim 15 wherein said nose portion has an axially extending bore, and said valve plug has a stem portion sized to slide through said axially extending bore to reach outside said nose portion when said pressurized gas exceeds said predetermined threshold.

17. The system of claim 16 wherein said stem portion reaching through said nose portion visually indicates said pressurized gas has exceeded said predetermined threshold.

18. The system of claim 17 wherein said wire is a fifteen thousandths of an inch outer diameter copper wire.

* * * * *